US009325976B2

(12) United States Patent
Atkins

(10) Patent No.: US 9,325,976 B2
(45) Date of Patent: Apr. 26, 2016

(54) DISPLAYS, INCLUDING HDR AND 3D, USING BANDPASS FILTERS AND OTHER TECHNIQUES

(75) Inventor: Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 722 days.

(21) Appl. No.: 13/456,820

(22) Filed: Apr. 26, 2012

(65) Prior Publication Data

US 2012/0281026 A1    Nov. 8, 2012

Related U.S. Application Data

(60) Provisional application No. 61/481,394, filed on May 2, 2011.

(51) Int. Cl.
*H04N 13/04* (2006.01)
*G02B 27/22* (2006.01)
(Continued)

(52) U.S. Cl.
CPC ........ *H04N 13/0431* (2013.01); *G02B 27/2207* (2013.01); *G09G 3/003* (2013.01); *G09G 3/3413* (2013.01); *H04N 13/0422* (2013.01); *H04N 13/0434* (2013.01); *H04N 13/0438* (2013.01); *H04N 13/0452* (2013.01); *H04N 13/0497* (2013.01); *G09G 3/342* (2013.01); G09G 2320/0646 (2013.01); G09G 2320/0666 (2013.01); G09G 2320/0693 (2013.01); G09G 2360/145 (2013.01)

(58) Field of Classification Search
CPC .............. H04N 13/0422; H04N 9/641; H04N 13/0454; H04N 17/02; H04N 17/04; H04N 13/0431; G02F 1/133603; G02F 1/133615; G02F 1/133606; G02F 1/133608; G02F 1/133611; G02B 27/2207
See application file for complete search history.

(56) References Cited

U.S. PATENT DOCUMENTS 4,134,644 A * 1/1979 Marks et al. .................. 359/466
4,734,756 A * 3/1988 Butterfield et al. ............. 348/43
(Continued)

FOREIGN PATENT DOCUMENTS

DE    10057102    5/2002
DE    10359788    4/2005
(Continued)

OTHER PUBLICATIONS

D. DeAgazio, "Thin is in: LED Backlight Units Are Becoming Thinner and Brighter to Meet Consumer-Product Requirements", Information Display, Feb. 2009, at 16-20.*
(Continued)

*Primary Examiner* — David N Werner
(74) *Attorney, Agent, or Firm* — Larry E. Henneman, Jr.; Henneman & Associates, PLC

(57) ABSTRACT

A 3D display incorporates laser or saturated light sources to produce 3D images. The images may be produced on an LCD display or projector. Ambient light is filtered out through viewing glasses having passbands corresponding to the light sources. The light sources may include 2 sets of primary lights (one for each of 2 3D viewing channels) and a third set of primaries common to both channels. The display may be configured for a 2D display mode and a bandpass filter may be placed on a display surface to reduce reflections. The display may be a locally modulated or constant backlit LCD display.

22 Claims, 8 Drawing Sheets

(51) Int. Cl.
*G09G 3/00* (2006.01)
*G09G 3/34* (2006.01)

(56) References Cited

U.S. PATENT DOCUMENTS

| | | | |
|---|---|---|---|
| 5,402,191 A * | 3/1995 | Dean et al. | 352/63 |
| 5,537,476 A | 7/1996 | Coteus | |
| 5,936,663 A | 8/1999 | Tabata | |
| 5,978,142 A | 11/1999 | Blackham | |
| 6,283,597 B1 | 9/2001 | Jorke | |
| 6,532,008 B1 | 3/2003 | Guralnick | |
| 6,698,890 B1 | 3/2004 | Jorge | |
| 7,050,122 B2 | 5/2006 | Gibbon | |
| 7,403,332 B2 | 7/2008 | Whitehead | |
| 7,413,307 B2 | 8/2008 | Whitehead | |
| 7,583,331 B2 | 9/2009 | Whitehead | |
| 7,784,938 B2 | 8/2010 | Richards | |
| 7,832,869 B2 | 11/2010 | Maximus | |
| 7,959,295 B2 | 6/2011 | Richards | |
| 2003/0067539 A1 * | 4/2003 | Doerfel et al. | 348/51 |
| 2004/0012670 A1 * | 1/2004 | Zhang | G02B 27/2207 348/46 |
| 2006/0103932 A1 * | 5/2006 | Relke et al. | 359/462 |
| 2007/0127121 A1 | 6/2007 | Maximus | |
| 2007/0188711 A1 * | 8/2007 | Sharp | G02F 1/133621 353/8 |
| 2007/0236617 A1 * | 10/2007 | Lippey | H04N 13/0422 349/5 |
| 2007/0236809 A1 * | 10/2007 | Lippey | G02B 5/285 359/722 |
| 2007/0247709 A1 | 10/2007 | Karakawa | |
| 2008/0151193 A1 * | 6/2008 | Reder | H04N 13/0431 353/7 |
| 2008/0278574 A1 * | 11/2008 | Ramstad | H04N 13/0431 348/51 |
| 2008/0278807 A1 * | 11/2008 | Richards | G02B 27/2207 359/464 |
| 2008/0284982 A1 * | 11/2008 | Richards | G02B 5/20 352/38 |
| 2009/0085912 A1 * | 4/2009 | Scott | H04N 13/0033 345/419 |
| 2009/0153752 A1 | 6/2009 | Silverstein | |
| 2009/0190095 A1 * | 7/2009 | Ellinger | G02B 27/2207 353/7 |
| 2009/0257120 A1 | 10/2009 | Nelson | |
| 2009/0284586 A1 * | 11/2009 | Ramstad | G09G 5/026 348/60 |
| 2009/0316114 A1 * | 12/2009 | Richards | G02B 26/008 348/46 |
| 2010/0013911 A1 * | 1/2010 | Jacobs | G02B 35/18 348/54 |
| 2010/0039352 A1 * | 2/2010 | Lippey | G02B 5/285 345/7 |
| 2010/0060857 A1 * | 3/2010 | Richards | G02B 5/285 353/7 |
| 2010/0066813 A1 * | 3/2010 | Jorke | H04N 13/0033 348/46 |
| 2010/0097549 A1 * | 4/2010 | Ishikawa et al. | 349/115 |
| 2010/0208041 A1 * | 8/2010 | Savvateev et al. | 348/51 |
| 2010/0208342 A1 * | 8/2010 | Olsen | H04N 13/0422 359/464 |
| 2010/0225836 A1 * | 9/2010 | Ockenfuss | G02B 27/2264 349/15 |
| 2011/0050683 A1 * | 3/2011 | Yun et al. | 345/214 |
| 2011/0102562 A1 * | 5/2011 | Johnson, Jr. | H04N 13/0422 348/58 |
| 2011/0187715 A1 * | 8/2011 | Jacobs | H04N 13/0431 345/426 |
| 2012/0044281 A1 * | 2/2012 | Kang | 345/690 |
| 2012/0062607 A1 * | 3/2012 | Erinjippurath et al. | 345/690 |
| 2012/0133649 A1 * | 5/2012 | Reder | H04N 13/0431 345/419 |
| 2013/0033491 A1 * | 2/2013 | Atkins | G09G 3/003 345/419 |
| 2013/0083081 A1 * | 4/2013 | Silverstein | H04N 9/3117 345/690 |
| 2013/0181973 A1 * | 7/2013 | Silverstein | G02B 27/2207 345/419 |
| 2013/0182320 A1 * | 7/2013 | Silverstein | G02B 27/2207 359/464 |

FOREIGN PATENT DOCUMENTS

| | | |
|---|---|---|
| NL | 1982900 | 10/1983 |
| WO | 2004038457 | 5/2004 |

OTHER PUBLICATIONS

Digital Cinema Report "Prismatic Magic and Infitec Introduce 3D Laser Projection System".

* cited by examiner

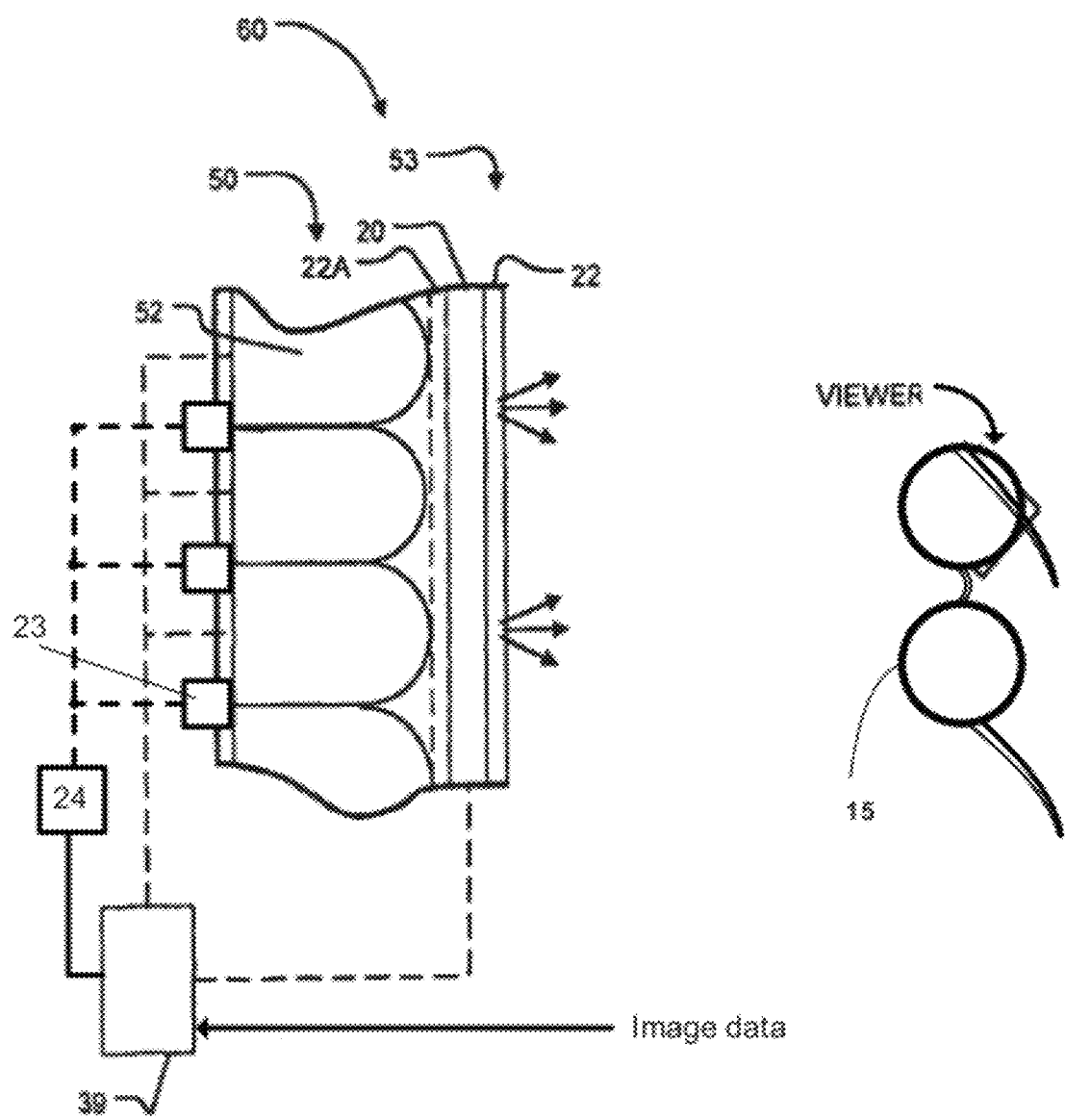

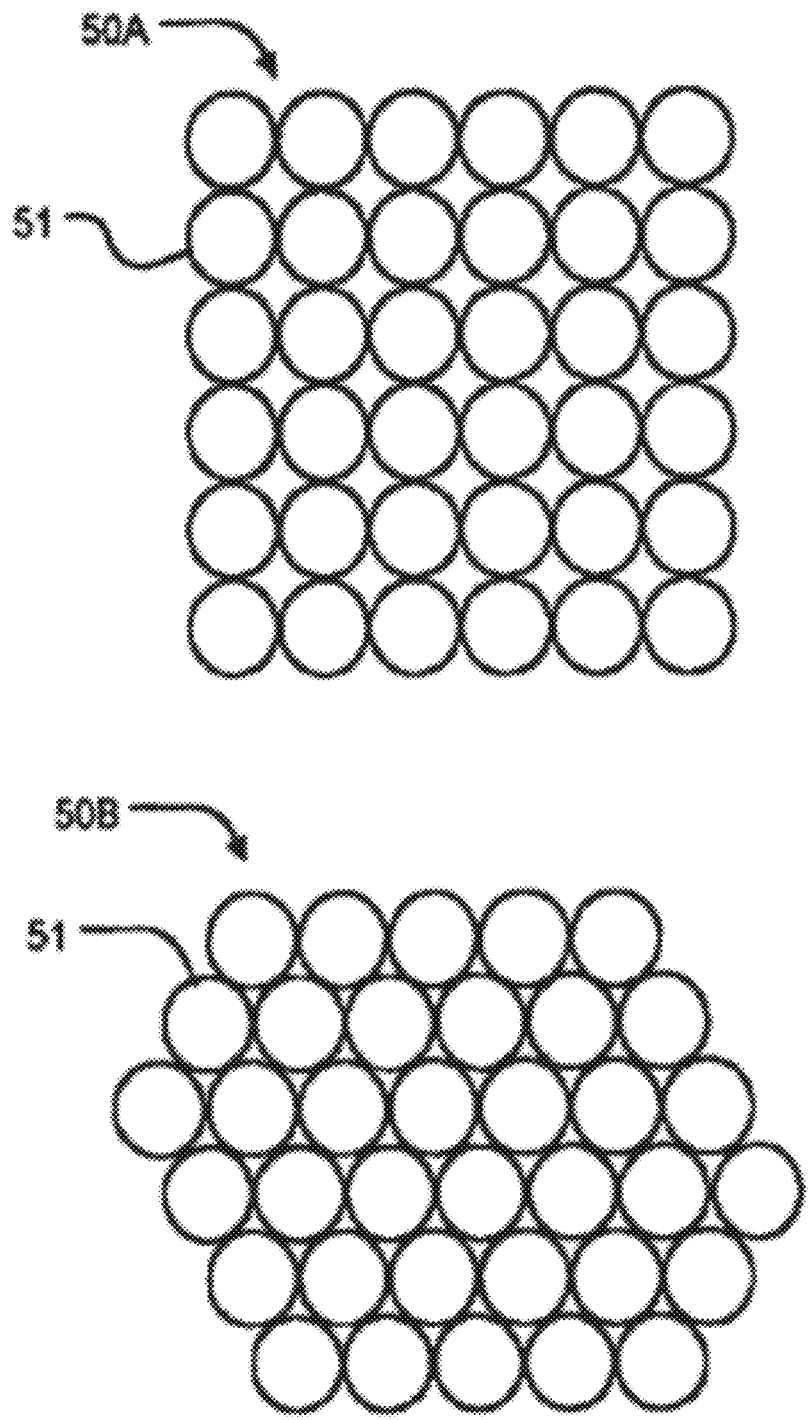

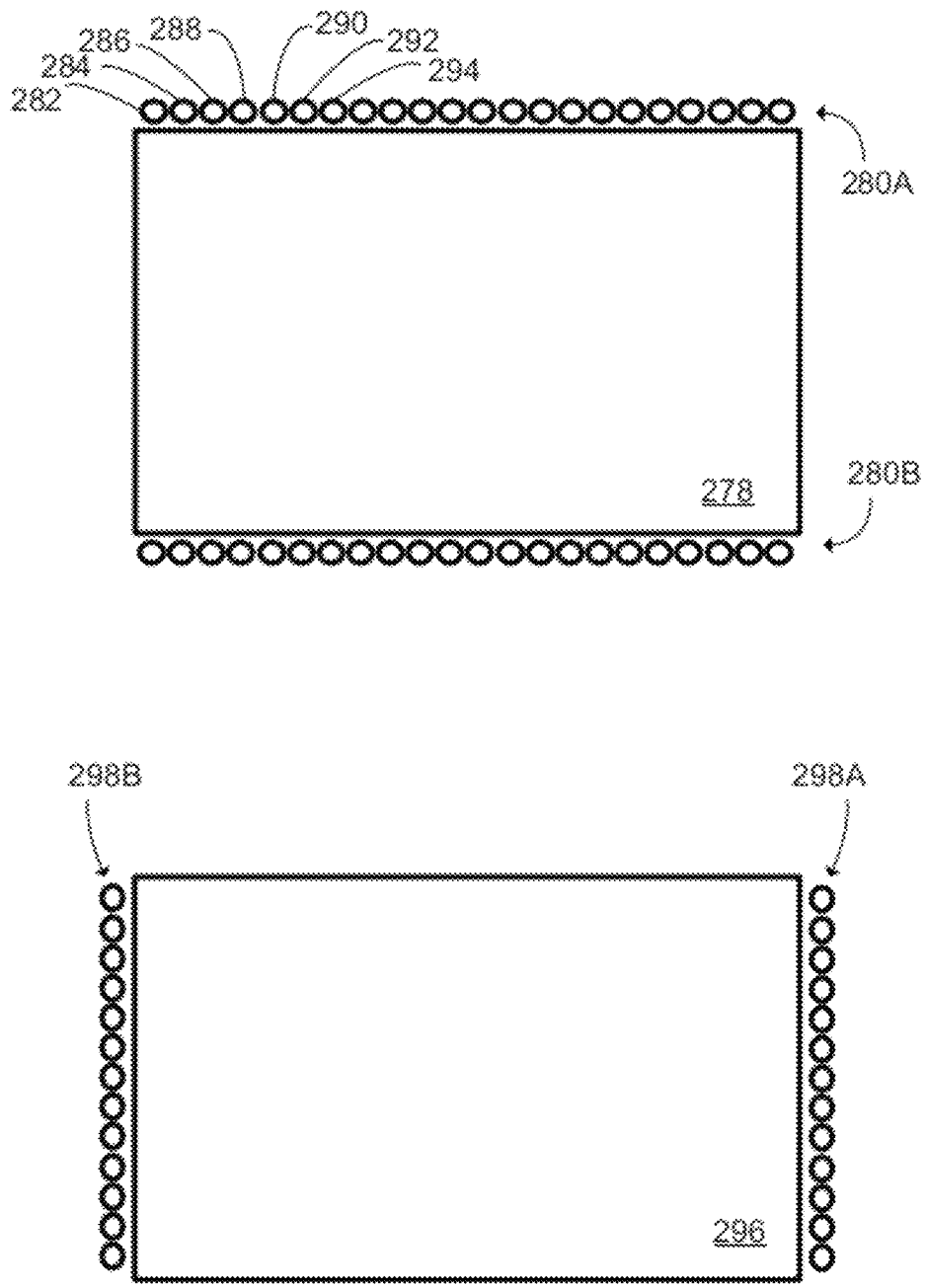

DISPLAYS, INCLUDING HDR AND 3D, USING BANDPASS FILTERS AND OTHER TECHNIQUES

CROSS REFERENCE TO RELATED APPLICATIONS

This application claims the benefit of priority to related, co-pending Provisional U.S. Patent Application No. 61/481,394 filed on 2 May 2011 entitled "Displays, Including HDR and 3D, Using Notch Filter and Other Techniques" by Robin Atkins hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to displays, and more particularly to 3D displays and HDR displays using bandpass filters.

2. Discussion of Background

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static, and is located in front of the projection lens. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

Dynamic range is the ratio of intensity of the highest luminance parts of a scene and the lowest luminance parts of a scene. For example, the image projected by a video projection system may have a maximum dynamic range of 500 or 600:1.

In contrast, the human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" has generally been equated to means dynamic ranges of 800:1 or more.

Modern digital imaging systems are capable of capturing and recording digital representations of scenes in which the dynamic range of the scene is preserved. Computer imaging systems are capable of synthesizing images having high dynamic ranges.

However, current display technology is not capable of rendering images in a manner which faithfully reproduces high dynamic ranges.

Blackham et al., U.S. Pat. No. 5,978,142 discloses a system for projecting an image onto a screen. The system has first and second light modulators which both modulate light from a light source. Each of the light modulators modulates light from the source at the pixel level. Light modulated by both of the light modulators is projected onto the screen.

Gibbon et al., International Application No. PCT/US01/21367 discloses a projection system which includes a pre modulator. The pre modulator controls the amount of light incident on a deformable mirror display device. A separate pre-modulator may be used to darken a selected area (e.g. a quadrant).

Whitehead et al., U.S. Pat. No. 7,413,307 provides high dynamic range displays capable to 800:1 and greater contrast ratio.

Despite the plurality of technologies for reproducing and displaying images, there exists a need for cost effective displays capable of reproducing a wide range of light intensities in displayed images including displays with HDR and/or 3D capabilities.

SUMMARY OF THE INVENTION

The present inventor has realized the need for improved efficiency in 3D displays. In one embodiment, the present invention provides a 3D display comprising a first set of primary light sources corresponding to a first channel of the 3D display and a second set of primary light sources corresponding to a second channel of the 3D display, a modulating panel configured to modulate lights of the first channel of the 3D display with image data corresponding to a first view of a 3D image and modulate lights of the second channel of the 3D display with image data corresponding to a second view of the 3D image. Viewing glasses having passband filters in lens positions of the glasses are utilized to separate the channels for viewing through a left eye (e.g., corresponding to the first channel) and a right eye (e.g., corresponding to the second channel) for 3D effect.

The display may further comprise a third set of primary lights, and, viewing glasses comprising a first set of passbands configured to pass the first set of primary lights and the third set of primary lights, and a second set of passbands configured to pass the second set of primary lights and the third set of primary lights.

Alternatively, or in combination, the display may further comprise a third set of primary lights, and, a controller configured to utilize the third set of primary lights for displaying image data of the 3D image common to the first and second channels.

In yet another alternative, or any combination, the display may further comprise a bandpass filter on a display panel or screen of the display.

The present invention includes a method of energizing a backlight or second stage modulator according to any of the embodiments described herein. Portions of both the devices and methods of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is an illustration of a laser light source backlight and controller according to an embodiment of the present invention;

FIG. 2B is an illustration of arrangements of light sources according to embodiments of the present invention;

FIG. 2C is an illustration of edge lit display devices according to embodiments of the present invention;

DESCRIPTION OF THE PREFERRED EMBODIMENTS

Figure 1:
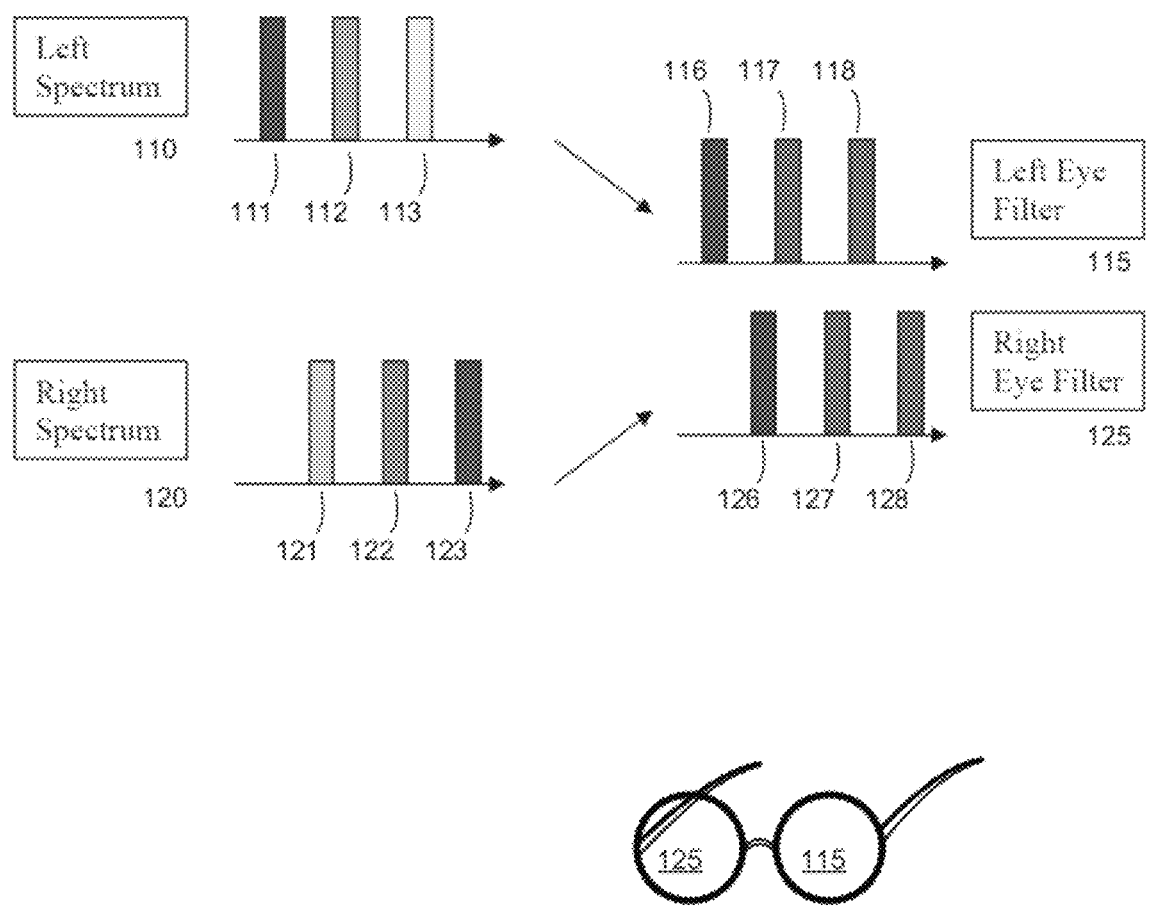
FIG. 1 is an illustration of passbands for left and right channels in a spectrally separated 3D system according to an embodiment of the present invention.

Referring now to the drawings, wherein like reference numerals designate identical or corresponding parts, and more particularly to FIG. 1 thereof, there is an illustration of passbands for left and right channels in a spectrally separated 3D system according to an embodiment of the present invention. The passbands may be implemented in a filter described as a bandpass filter.

Laser light sources have very narrow band emission characteristics. Passive 3D glasses are very well positioned to take advantage of the characteristics of laser projectors. Passive glasses with filter characteristics as shown in FIG. 1, allow only the illustrated narrow bands of the light spectrum to each eye. A spectrum 110 associated with a left eye channel comprises a red laser emission 111, a green laser emission 112, and a blue laser emission 113 (e.g., R1, G1, B1). A spectrum 120 associated with a right eye channel comprises a red laser emission 121, a green laser emission 122, and a blue laser emission 123 (e.g., R2, G2, B2). The right and left spectrums are not necessarily pure red, green, or blue colors, but general fall in an area of spectrum associated with red, green, and blue. LEDs emitting saturated light at similar wavelengths may also be utilized, or a combination of LED and laser light sources.

Left eye filter 115 includes passbands 116, 117, and 118 corresponding to left spectrum lights 111, 112, and 113 respectively. Right eye filter 125 includes passbands 126, 127, and 128 corresponding to right spectrum lights 121, 122, and 123 respectively. The passbands may be directly overlaying on the spectra of the light sources, or, they may be overlaid and include tolerance and or shifting passbands that accommodate for tolerance issues and/or a "blue shift" effect when viewing through filters at off-normal angles. The "blue shift" effect is the apparent shifting of passbands toward blue when viewing light at other than normal angles through the passbands. Guard bands between adjacent filters of opposite channels are configured to reduce or eliminate crosstalk.

Two sets of laser primaries are used, one corresponding to the passbands for the left eye, and the other to the passbands for the right eye. Both sets of primaries can be displayed simultaneously using two projectors or sequentially using a single projector. Both sets of primaries may also be displayed simultaneously in a projector configured to separately modulate left and right channel spectrum. The present invention specifically includes a single projector or display apparatus capable of modulating left and right channel spectras simultaneously. Such projectors may include, for example, two sets of modulating optics (one for the right channel and one for the left channel) and then the modulated spectras are combined before (or at the same time as) projecting them onto a screen or display panel.

Ambient light in the environment is mostly blocked by the bandpass filters, except for the relatively small amount of energy aligned with the bandpass filters. This results in low minimum light levels (good blacks). This is an advantage over polarized systems, which transmit roughly 50% of ambient light.

The optical efficiency of the system is relatively high for 3D systems, which enables high maximum light levels (good whites). This is another advantage over polarized systems, as typically creating a polarized light source discards 50% of light energy at source, on top of the additional 50% at the glasses. The combination of good blacks and good whites results in good contrast, or dynamic range.

FIG. 2A is an illustration of a laser light source backlight and controller according to an embodiment of the present invention. A display 60 according to an embodiment of the invention includes a display panel 53 which includes a modulating layer 20 (e.g., LCD panel) and may comprise a diffusing layer 22, and other optical sheets 22A. The display panel is illuminated by a backlight 52 comprising, for example, a plurality (e.g., an array) of light sources 52 (e.g., LEDs). The light sources may be for example, laser devices each having a built in light spreading optics, fully saturated light sources, or less than fully saturated light sources emitting wavelengths in accordance with those discussed herein (e.g., 2 different sets of Red, Green, and Blue (or other primary color) emissions corresponding to left and right channels of a 3D system). In this example, the light sources directly backlight the display panel 53. In one embodiment, the light sources are LEDs or a combination of LEDs and another light source.

The brightness of each light source 52 is controlled by a controller 39. The light modulator 20 includes controllable elements that may include, for example, a plurality of colored sub-pixels, also controlled or energized, for example, by the controller 39 (which may be embodied as a single controller device or a disparate collection of electronics and/or programming).

LEDs 52 may be arranged in any suitable manner. Two likely arrangements of LEDs 52 are shown in FIG. 2B, which illustrates a rectangular array 50A of light sources 51 and a hexagonal array 50B of light sources 51. Light sources 51 may comprise LEDs. Where light sources 51 comprise discrete devices, a regular spacing (or more spread out pattern) between light sources 51 may be maintained (not shown).

Optical sheets 22A may include a diffuser in conjunction with the light-emitting characteristics of LEDs 52 to cause the variation in intensity of light from LEDs 52 over the rear face of light modulator 20 to be smooth (vary smoothly across the backside of modulator 20).

FIG. 2C is an illustration of a laser light source edge lit locally dimmed display 278 according to an embodiment of the present invention. The display 278 may utilize electronics similar to that shown in FIG. 2A and described herein, in this case each LED illuminating a zone which then backlights a display panel (rather than direct backlighting).

A row (or array) of LEDs 280A and 280B inject light mainly in a plane parallel to the display panel. An anisotropic diffuser (e.g., a diffuser that scatters light travelling parallel to the display panel more than light traveling perpendicular to the display panel) is utilized and may be part of a planar waveguide behind a display panel. The diffuser receives light from the LEDs 280A or 280B that is mainly directed parallel to a plane of the display panel. The received parallel light is then anisotropically scattered namely in a direction perpendicular to and into the plane of the display panel. The waveguide/diffuser may be constructed with properties similar to the diffuser described in Whitehead, U.S. Pat. No. 7,583,331.

The anisotropic diffuser is, for example, a waveguide which receives light from the laser or saturated light sources and includes any of etchings, particles, perturbations, etc that cause light entering the waveguide to exit perpendicular to the waveguide (e.g., namely changing the direction of light from parallel through the waveguide to perpendicular and out of the waveguide (e.g., out of the page in FIG. 2C)). The etchings, particles or other perturbations are configured, for example, so that the light is mostly reflected, or diffused, toward the display panel. In one embodiment, the etchings, particles, and/or other perturbations are arranged on one side of the waveguide (e.g., a side furthest from the display panel)). The light sources may include or be used in conjunction with spreading optics or other mechanisms to disperse the light beam produced by the light sources prior to entering the anisotropic diffuser.

The etchings, particles or other perturbations may be spaced apart in a manner that results in a relatively uniform distribution of light in each zone. For example, in one embodiment, more etchings are present in a central area of the waveguide in an effort to reflect/diffuse more of the available light to counteract etchings on the edge of the waveguide that are more brightly illuminated and therefore reflect more light on a per etching basis due to their closer proximity to the light sources/LEDs. The size of the etchings may also be varied to cause a higher percentage of light to exit the waveguide when in an area having less illumination.

Each row of LEDs (or light sources) may also include a reflector interspersed between the LEDs and utilized to re-reflect light into the waveguide if it travels the length of the waveguide without exiting. In this manner, efficiency is increased because light will generally travel back and forth in the waveguide giving it additional opportunity to be anisotropically scattered and exit the waveguide toward the display panel.

The zones of light have enough overlap to produce backlighting on the display panel of either left or right spectrum properties. The controller energizes the LEDs, for example, such that the display panel is backlit in an alternating pattern of right spectrum and then left channel spectrum. In one embodiment, the zones of light are segmented such that one portion or portions of the display panel is backlit (illuminated) with right channel spectrum and another portion or portions of the screen are backlit with left channel spectrum. Energization of the display panel (e.g., energization of individual pixels of an LCD panel) is performed with image data for either the left or right channel depending of what spectrum is illuminating the individual pixels at the time the display panel is being energized. The result is a dual modulation of left and right channels producing high contrast (HDR).

The LEDs may be arranged, for example, such that similar colors are close together (e.g., R1 at position 282, R2 at 284;

B1 at 286, B2 at 288; G1 at 290, G2 at 292; R1 at 294; and so forth). In one embodiment, the LEDs are interspersed (e.g., R1 at position 282, B1 at 284, G1 at 286; R2 at 288, B2 at 290, G2 at 292; R1 at 294; and so forth). In one embodiment row 280B mirrors the selection LEDs of row 280A. In another embodiment, row 280B comprises opposite channel LEDs of the same general color as selected for an opposing position in row 280A. In yet another embodiment, row 280B selects different colors or different colors and different channels for each position in row 280B compared to those selected for opposing positions in row 280A.

Laser light source edge lit locally dimmed display 296 illustrates short row edge lighting in row 298A and 298B. The short edge rows may be utilized in a similar manner as rows 280A and 280B of display 278. In one embodiment, the rows 298A and 298B supplement a display having rows 280A and 280B such that laser light (or LED) illumination comes from all edges.

Figure 3:
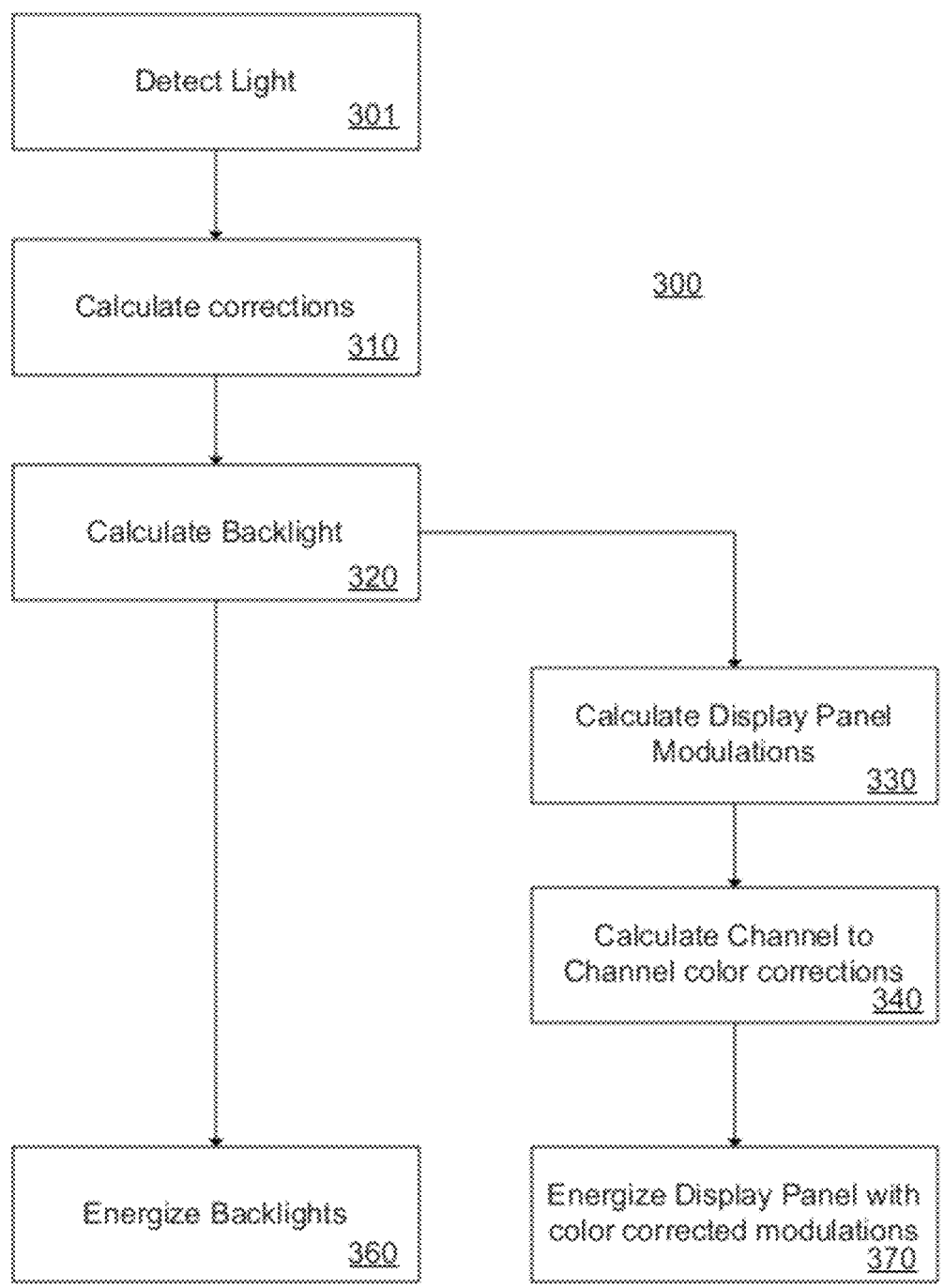
FIG. 3 is a flow chart illustrating color correction according to an embodiment of the present invention.

FIG. 3 is a flow chart illustrating color and backlight correction process 300 according to an embodiment of the present invention. Note that the present invention includes the use of spectrally separated left and right eye channels for display of 3D images in conjunction with locally modulated or locally dimmed backlight (e.g., backlight 52). The backlight is energized to produce a low resolution version of a desired image (a first stage modulation) by the controller which receives image data and is configured to determine an energization pattern that results in the low resolution version of the image. The backlight illuminates an LCD panel or other modulator (the display panel) that then further modulates the low resolution version of the desired image (a second stage modulation) to produce a high resolution HDR version of the desired image (the output image).

The present invention includes maintaining a backlight that is modulated and has an output (illumination) that varies smoothly from an area predominately illuminated by one backlight or set of backlights to a next area predominately illuminated by another backlight or group of backlights. The present invention includes adjustments in the modulation for the image or frames (e.g. each frame) of a video.

The adjustments may be made at an individual pixel or LED level and include adjustments to correct for broken or malfunctioning backlights, aged LEDs, etc. To do so, a sensor (e.g., see FIG. 2A, sensor 23) detects any one or more of color, spectrum, temperature, and brightness of individual or sets of LEDs. In the illustrated embodiment, sensor 23 (which may be more than one sensor combined) is set to detect light (e.g., step 301) from a plurality of LED backlights (e.g., spectroradiometer, illumination meter, etc). Alternative methods for detecting the backlights are discussed, for example in Whitehead, et al., U.S. Pat. No. 7,403,332. Regardless of how the backlight is detected, the detected light is analyzed and a correction is calculated (step 310). The corrections may include, for example, altering the duty cycle of one or more LEDs to alter the brightness, changing the color or temperature of the backlight in the area where the light was detected, increasing the predominance of one or more colors by increasing the brightness of any individual light source.

The backlight energization is then calculated (step 320). Backlight energization is an energization that is designed to produce a low resolution version of the desired image (image to be displayed) along with the backlight corrections. The display panel modulation is then calculated (step 330). The Display Panel Modulations are modulations configured to further modulate the low resolution version of the desired image into the desired image.

The display panel modulations may be calculated based solely on the image data or, preferably, take into account the backlight energizations that will cause a known pattern of light and illumination intensities on the display panel. Based on the known pattern of light (e.g., including any corrections), the display modulations are calculated and provided, for example, as modulation data to be fed to drivers for energizing the display panel (e.g., TCON board to a suite of LCD panel drivers).

Color corrections (or color matching adjustments) are calculated (step 340) and then applied to the display panel modulation data. The color corrections are, for example, adjustments in intensity of the colors in a frame or portion of a frame of video data that corresponds to an image of a right or left channel. The color corrections are desirable at least due to the fact that a left channel image and a right channel image which share essentially the same colors are being reproduced from two different sets of color primaries (and adjustments are utilized so they will match correctly). Depending on the calculated backlight, other adjustments may be necessary. The present invention includes making color corrections based on an actual or corrected backlight. The actual or corrected backlight may be, for example, the backlight as calculated or detected after corrections 310 are applied.

In one embodiment, one of the channels is adjusted so that the colors it produces more closely match the color(s) of the other channel (e.g., match the left channel to the right or match both channels to an intermediate or common color space (e.g., see common color space in FIG. 5)). Such matching may be done, for example, in response to the calculated or detected backlight and image data. In another embodiment both of the channels are adjusted to a central or "midpoint" between the two colors. Other types of color corrections may also be implemented at this stage and effected by energizing the display panel based on the corrections/adjustments. The display panel (e.g., LCD panel) is then energized 370 simultaneously with energization of the backlights 360 to create the desired (HDR 3D) image.

Figure 4:
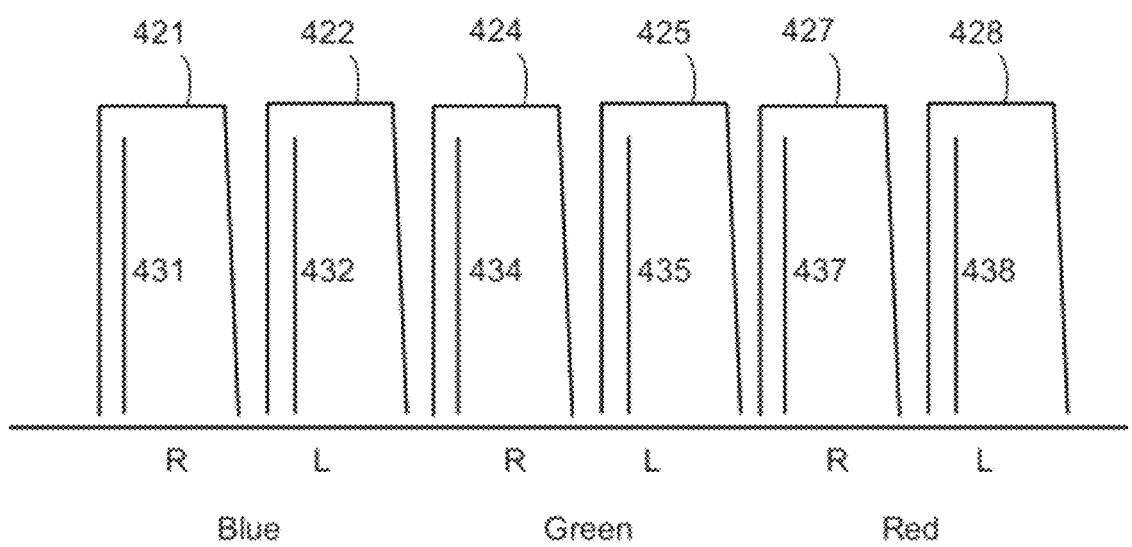
FIG. 4 is an illustration of passbands and corresponding light spectras for a dual modulation LED based LCD flat panel display according to an embodiment of the present invention.

FIG. 4 is an illustration of passbands 421-428 and corresponding light source spectras 431-438 for a dual modulation based LCD flat panel display according to an embodiment of the present invention. The light sources are, for example, lasers or saturated LEDs that illuminate (backlight) an LCD panel. The light sources may be configured by a controller to, for example, alternate between an illumination comprising a right channel spectra and an illumination comprising a left channel spectra. The LCD panel is then alternately and correspondingly energized with image data (e.g., color corrected image data) for the right channel image and the left channel image. Passbands illustrated in FIG. 4 are, for example, passbands to be implemented as a bandpass filter as an outer layer of the display panel or as a set of filters to be utilized as lenses in viewing glasses (e.g., viewing glasses 15).

The passbands for the right and left channels are respectively engineered to pass the wavelengths contained in the right and left channel spectras. In addition, the passbands are preferably and specifically configured to pass a normally incident wavelength at a blue end of the passband, providing a shifting area (or passband) toward the red end of the passband. This is because off-axis viewing through spectral filters causes a blue "shift" of the passband properties. By offsetting the laser wavelengths inside the larger passband (i.e., having a shifting area), the wavelengths can be viewed at a substantial off-axis angle without the passband "shifting" past the wavelength(s) of light to be viewed. Further discussion on the "blue shift" can be gleaned from Richards, U.S. Application No. 61/452,638. The passbands of FIG. 4 are specifically spread out so that an optimally large shifting area can be generated without increasing the risk of crosstalk between the channels (e.g., maintaining a significant guard band and tolerance band which reduces/eliminates crosstalk).

Figure 5:
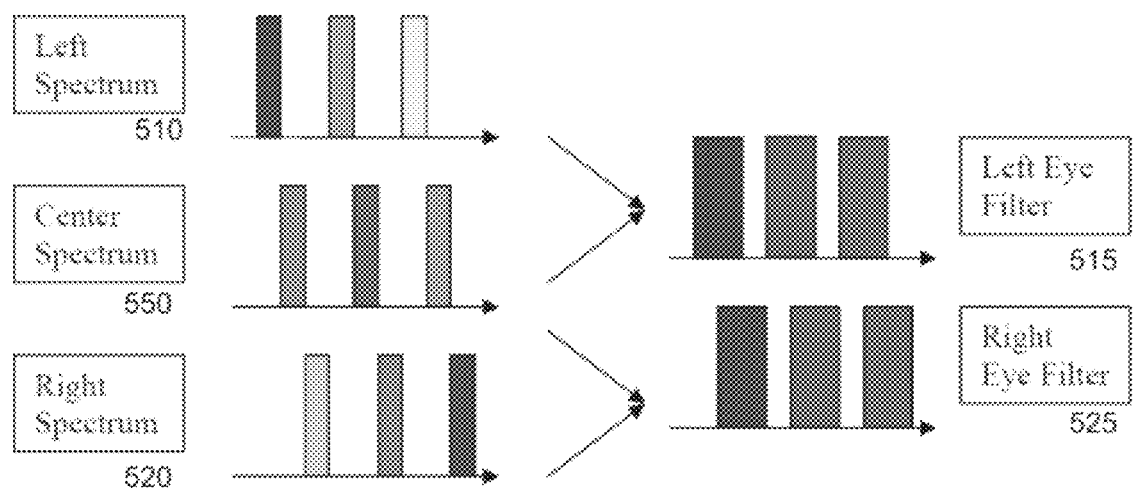
FIG. 5 is an illustration of passbands for left and right channels in a spectrally separated 3D system having a set of primaries common to both channels according to an embodiment of the present invention.

FIG. 5 is an illustration of passbands for left and right channels in a spectrally separated 3D system having a set of primaries common to both channels according to an embodiment of the present invention. Here, a third set of primaries (Center Spectrum 550) and passbands are common to both left and right channels. Content that is common to both channels is presented using this third set of primaries, which is close to 100% efficiency. The only content that is presented through the less efficient optical path to the individual left and right eyes is the image content that is unique to each eye. A polarized system is not able to provide a third view with high efficiency as only two polarized states are available.

An image processing step (e.g., performed by controller 39, for example) calculates the optimal 3-primary system from a given L and R image pair, to maximize system efficiency. The increased efficiency allows for higher maximum light levels (brighter whites), which further increases the dynamic range. The left eye filter 515 and the right eye filter 525 contain enlarged passbands that overlap with each other and are either coincident, surrounding, or offset for shifting, with the center spectrum 550.

Figure 6:
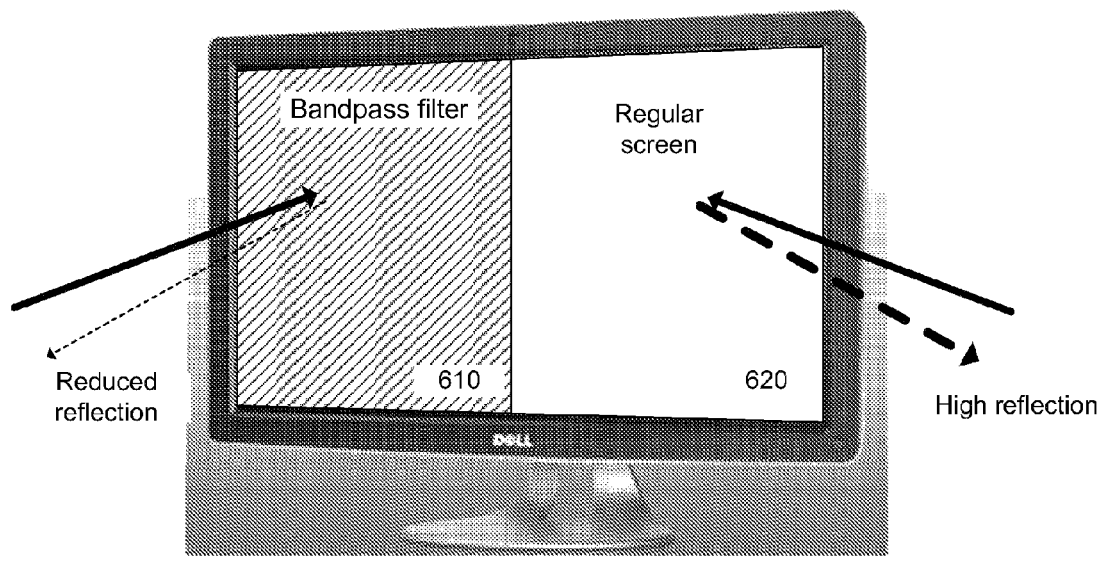
FIG. 6 is a drawing of a demonstration display incorporating a bandpass filter according to an embodiment of the present invention.

FIG. 6 is a drawing of a demonstration display 600 incorporating a bandpass filter according to an embodiment of the present invention. For applications where the viewer is not wearing passive glasses, the bandpass filters can still be used to increase contrast of a projection or display system. By incorporating a bandpass filter over a display screen (e.g., television, computer monitor) having narrow primaries, reflections of ambient light can be eliminated while not interfering with the television spectrum. Similarly, incorporating a bandpass filter over a projection screen will eliminate most reflected ambient light, while not interfering with the projector spectrum. As shown in FIG. 6, a side 610 of display 600 comprises a bandpass filter and side 620 does not include a bandpass filter. With similar ambient light incident, the bandpass filter side 610 exhibits a lower intensity reflection.

Accordingly, the present invention specifically includes providing a bandpass filter as part of a display screen (e.g., overlaying the bandpass filter over a display). In one embodiment, the bandpass filter overlaid comprises an outer (or outside) layer of the display screen. In one embodiment, the bandpass filter is an outer layer just downstream of a final diffuser in the display. The bandpass filter may comprise passbands equivalent to intended spectrum(s) of light to be emitted by the display. Alternatively, the passbands may correspond with, but are larger than, the intended emitted spectrum(s).

For best contrast performance, passbands of the display screen or passbands of viewing glasses should be chosen not to coincide (or minimize coincidence) with common lighting spectra, for example fluorescent, LED and tungsten. This will ensure that the majority of ambient light is absorbed by the filter. In these types of embodiments, the filter material may comprise, for example, absorptive filter material including passbands which are passed rather than absorbed.

Although the present invention has been described herein with reference to LCD panels and dual modulation displays with which they are advantageous, the present invention includes the application of any of the above to laser cinema projectors, home or pico-projectors using laser light sources, rear projection televisions, or televisions having narrow primary light sources (whether locally dimmed, globally dimmed, or static backlights), or any combination of the above which are also advantageous.

In particular, a combination of a theater system including a pico-projector for highlights or special effects. In the case of a dual modulated display, one or more pico-projectors may be fitted at edges of (and enclosed in) the display (e.g., between the backlight and the display panel) and project onto a backside) of the display panel (or front side of the display panel in the case of, for example, externally installed pico-projectors). Such projections may include highlights, special effects, and, for example, bright spots on dark backgrounds (e.g., star fields). In one embodiment, the pico projector emits red, green, and blue wavelengths forming a color corrected image and targeting a blue end of corresponding "red," "green," and "blue" passbands in viewing glasses for the system. One advantage is for low-cost personal 3D projectors, which would have, for example, deeper blacks due to filtering of the ambient environment.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing LEDs, lasers, light sources, reflectors, panels, diffusers, any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to panels, filters, modulators, light sources, controllers, calculations, determinations/simulations, displays, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, analyzing detected light including spectrum, calculating backlight corrections, calculating backlight intensities for spectrum and/or brightness calculating second stage modulations based on a corrected backlight and including color adjustments such as color matching (color correction) in the second stage modulations, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A 3D display comprising:
   a first set of a plurality of primary light sources corresponding to a first channel of the 3D display;
   a second set of a plurality of primary light sources corresponding to a second channel of the 3D display;
   a third set of a plurality of primary light sources corresponding to a common channel of the 3D display; and
   a modulating panel configured to modulate lights of the first channel with image data corresponding to a first view of a 3D image, modulate lights of the second channel with image data corresponding to a second view of the 3D image, and modulate lights of the common channel with image data corresponding to a common view of the 3D image; and wherein
   the first set of a plurality of primary light sources emits light at first wavelengths in the red, green, and blue regions of the visible spectrum;
   the second set of a plurality of primary light sources emits light at second wavelengths in the red, green, and blue regions of the visible spectrum, the second wavelengths being different than the first wavelengths; and
   the third set of a plurality of primary light sources emits light at thirds wavelengths in the red, green, and blue regions of the visible spectrum.

2. The 3D display according to claim 1, further comprising viewing glasses comprising a first set of passbands configured to pass the first set of a plurality of primary lights and the third set of primary lights, and a second set of passbands configured to pass the second set of primary lights and the third set of a plurality of primary lights.

3. The 3D display according to claim 1, further comprising:
   a bandpass filter on a display panel or a screen of the 3D display, the bandpass filter configured to pass all image forming wavelengths of the first set of a plurality of primary light sources, the second set of a plurality of primary light sources, and the third set of a plurality of primary light sources; and wherein wavelengths passed by the bandpass filter correspond to wavenlengths of light passed by passbands of the glasses.

4. The 3D display according to claim 3, wherein the bandpass filter comprises passbands only matching spectra of the primary light sources.

5. The 3D display according to claim 1, further comprising a controller configured to utilize the third set of a plurality of primary lights for displaying image data of the 3D image common to the first and second channels.

6. The 3D display according to claim 1, wherein the primary light sources are replicated in a repeating pattern and in a backlight configuration, the 3D display further comprising a controller configured to locally modulate the primary light sources according to image data to produce a low resolution version of a left and or right channel image to be displayed on the modulating panel.

7. The 3D display according to claim 6, further comprising color correction performed by said controller and embodied in energization data for the modulator.

8. The 3D display according to claim 1, further comprising a bandpass filter on a display panel or screen of the 3D display, the bandpass filter configured to pass all image forming wavelengths of the fist set of a plurality of primary light sources, the second set of a plurality of primary light sources, and the third set of a plurality of primary light sources.

9. A 3D display, comprising:
   a backlight comprising a plurality of light sources;
   a controller configured to energize the plurality of light sources to produce a low resolution version of a desired image based on image data; and
   a display panel comprising a modulator configured to further modulate the low resolution image to produce the desired image; and wherein
   the backlight comprises a first set of a plurality of primary light sources forming a first channel of a 3D image to be displayed, and a second set of a plurality of primary light sources forming a second channel of the 3D image to be displayed, and a third set of a plurality of primary light sources forming a common channel of the 3D image to be displayed;
   the first set of a plurality of primary light sources emits light at first wavelengths in the red, green, and blue regions of the visible spectrum;
   the second set of a plurality of primary light sources emits light at second wavelengths in the red, green, and blue regions of the visible spectrum, the second wavelengths being different than the first wavelengths; and
   the third set of a plurality of primary light sources emits light at third wavelengths in the red, green, and blue regions of the visible spectrum.

10. The 3D display according to claim 9, further comprising a pair of viewing glasses comprising a first eye lens comprising a first filter configured to pass primary lights from the first set of a plurality of primary light sources and the third set of a plurality of primary light sources and a second eye lens comprising a second filter configured to pass primary lights from the second set of a plurality of primary light sources and the third set of a plurality of primary light sources.

11. The 3D display according to claim 10, wherein the first and second filters comprise passbands for passing the primary lights wherein the passbands include shifting bands that allow for off-axis viewing of the primary lights.

12. The 3D display according to claim 9, further comprising:

a bandpass filter having passbands configured to pass all wavelengths of primary lights from the first set of a plurality of primary light sources, the second set of a plurality of primary light sources, and the third set of a plurality of primary light sources; and wherein the passbands of the bandpass filter correspond to passbands of 3D glassed used to view the display.

13. The 3D display according to claim 12, wherein the bandpass filter is placed downstream relative to the modulator.

14. The 3D display according to claim 12, wherein the bandpass filter is part of the display panel.

15. The 3D display according to claim 12, wherein the bandpass filter comprises an outer layer of the display and display panel.

16. The display according to claim 9, wherein the controller comprises a 2 stage correction mechanism configured to correct energization of the backlight and correct energization of the modulator in consideration of the backlight corrections and color matching.

17. The 3D display according to claim 9, further comprising a bandpass filter having passbands configured to pass all wavelengths of the three sets of primary light sources.

18. A method, comprising the steps of:
receiving image data and calculating an energization level for a backlight comprising a first set of a plurality of primary lights, a second set of a plurality of primary lights, and a third set of a plurality of primary lights;

calculating energization of a modulating panel illuminated by the backlight; and wherein during a first frame, the calculated backlight energization level comprises only the first of a plurality of primary lights and the calculated energization of the modulating panel only comprises modulations for a first channel of a 3D image;

during a second frame, the calculated backlight energization level comprises only the second set of a plurality of primary lights and the calculated energization of the modulating panel only comprises modulations for a second channel of the 3D image;

during a third frame, the calculated backlight energization level comprises only the third set of a plurality of primary lights and the calculated energization of the modulating panel comprises modulations for a common channel of the 3D image;

the first set of a plurality of primary lights emits light at first wavelengths in the red, green, and blue regions of the visible spectrum;

the second set of a plurality of primary lights emits light at second wavelengths in the red, green, and blue regions of the visible spectrum, the second wavelengths being different than the first wavelengths; and the third set of a plurality of primary lights emits light at third wavelengths in the red, green, and blue regions of the visible spectrum.

19. The method according to claim 18, further comprising the step of energizing the third set of a plurality of primary lights common channel of the 3D image in the third frame.

20. The method according to claim 18, further comprising:
passing all wavelengths generated by the backlight through a bandpass filter during each frame; and wherein passbands of the bandpass filter correspond to passbands of 3D glasses used to view the first, second, and common channels of the 3D image.

21. The method according to claim 18, further comprising the step of projecting the modulated images through a set of bandpass filters, a first bandpass filter comprising passbands for the first channel and the common channel and a second bandpass filter comprising passbands for the second channel and the common channel.

22. The method according to claim 18, further comprising passing all wavelengths generated by the backlight through a bandpass filter during each frame.

* * * * *